(12) United States Patent
Miyoshi

(10) Patent No.: US 8,842,137 B2
(45) Date of Patent: Sep. 23, 2014

(54) FRAME RATE CONVERSION APPARATUS, FRAME RATE CONVERSION METHOD, AND COMPUTER-READABLE STORAGE MEDIUM

(75) Inventor: Ai Miyoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 523 days.

(21) Appl. No.: 12/423,345

(22) Filed: Apr. 14, 2009

(65) Prior Publication Data

US 2009/0273541 A1 Nov. 5, 2009

(30) Foreign Application Priority Data

May 1, 2008 (JP) ................................. 2008-119987

(51) Int. Cl.
| | |
|---|---|
| G09G 5/10 | (2006.01) |
| G09G 5/00 | (2006.01) |
| H04N 7/01 | (2006.01) |
| H04N 21/4402 | (2011.01) |
| H04N 5/21 | (2006.01) |
| H04N 5/14 | (2006.01) |

(52) U.S. Cl.
CPC ..... *H04N 21/440281* (2013.01); *H04N 7/0132* (2013.01); *G09G 5/00* (2013.01); *G09G 2340/0435* (2013.01); *H04N 5/21* (2013.01); *H04N 5/144* (2013.01); *G09G 2320/103* (2013.01)
USPC .......................................... 345/690; 345/204

(58) Field of Classification Search
USPC ............................ 345/204–214, 690, 691, 3.2
See application file for complete search history.

(56) References Cited

U.S. PATENT DOCUMENTS

| | | | |
|---|---|---|---|
| 6,784,942 B2 | 8/2004 | Selby et al. | |
| 6,909,466 B1 | 6/2005 | Scheffler et al. | 348/459 |
| 7,050,501 B2 * | 5/2006 | Alvarez | 375/240.16 |
| 7,750,897 B2 * | 7/2010 | Nishi et al. | 345/204 |
| 8,405,768 B2 * | 3/2013 | Kawai | 348/441 |
| 2002/0047919 A1 | 4/2002 | Kondo et al. | |
| 2003/0122967 A1 | 7/2003 | Kondo et al. | |
| 2004/0012720 A1 | 1/2004 | Alvarez | |
| 2004/0070590 A1 * | 4/2004 | Lee et al. | 345/690 |
| 2005/0047504 A1 * | 3/2005 | Sung et al. | 375/240.2 |
| 2005/0053291 A1 * | 3/2005 | Mishima et al. | 382/236 |

(Continued)

FOREIGN PATENT DOCUMENTS

| | | |
|---|---|---|
| DE | 43 27 733 C1 | 6/1994 |
| EP | 0 339 365 A2 | 11/1989 |

(Continued)

OTHER PUBLICATIONS

European Search Report dated Aug. 12, 2009, regarding Application No. 09158050.6-2202.

(Continued)

*Primary Examiner* — Dmitriy Bolotin
(74) *Attorney, Agent, or Firm* — Fitzpatrick, Cella, Harper & Scinto

(57) ABSTRACT

A frame rate conversion apparatus for performing frame rate conversion upon distributing an input frame into a plurality of sub-frames detects the degree of motion of an image in the input frame, determines the amount of distribution of the plurality of sub-frames in accordance with the detected degree of motion, and distributes and outputs the plurality of sub-frames in accordance with the determined amount of distribution.

11 Claims, 12 Drawing Sheets

(56) References Cited

U.S. PATENT DOCUMENTS

| | | | |
|---|---|---|---|
| 2005/0075569 A1* | 4/2005 | Li et al. | 600/454 |
| 2005/0225681 A1 | 10/2005 | Sohn | |
| 2005/0237277 A1 | 10/2005 | Kawahara | |
| 2006/0092164 A1 | 5/2006 | Takeuchi et al. | 345/530 |
| 2006/0152620 A1 | 7/2006 | Morita | |
| 2007/0018934 A1* | 1/2007 | Kim et al. | 345/98 |
| 2007/0200838 A1* | 8/2007 | Lee et al. | 345/204 |
| 2007/0263126 A1 | 11/2007 | Chao et al. | |
| 2007/0273628 A1 | 11/2007 | Sato et al. | |
| 2008/0111835 A1 | 5/2008 | Hu | |
| 2008/0204592 A1* | 8/2008 | Jia et al. | 348/402.1 |
| 2008/0253669 A1 | 10/2008 | Hamada et al. | |
| 2009/0102771 A1 | 4/2009 | Sugisawa et al. | |
| 2009/0303391 A1 | 12/2009 | Jung et al. | |
| 2010/0214328 A1 | 8/2010 | Hara | |

FOREIGN PATENT DOCUMENTS

| | | |
|---|---|---|
| EP | 1 008 980 A1 | 6/2000 |
| EP | 1 786 200 A2 | 5/2007 |
| GB | 2 031 686 A | 4/1980 |
| GB | 2 092 858 A | 8/1982 |
| JP | 2001-296841 | 10/2001 |
| JP | 2002-351382 | 12/2002 |
| JP | 2007-52184 | 3/2007 |
| WO | WO 00/19713 | 4/2000 |

OTHER PUBLICATIONS

Ojo et al., "Robust Motion-Compensated Video Upconversion," IEEE Transactions on Consumer Electronics, vol. 43, No. 4, Nov. 1997, pp. 1045-1056.

Blume, "Nonlinear Vector Error Tolerant Interpolation of Intermediate Video Images by Weighted Medians," Signal Processing: *Image Communication*, 14(1999), pp. 851-868.

Chen et al., "P-44: Smooth Frame Insertion Method for Motion-Blur Reduction in LCDs," Proceedings of the Twenty-Fifth International Display Research Conference, EuroDisplay Sep. 2005, pp. 359-361.

European Office Action dated Jun. 30, 2011, in European Application No. 09158050.6.

* cited by examiner

F I G. 9
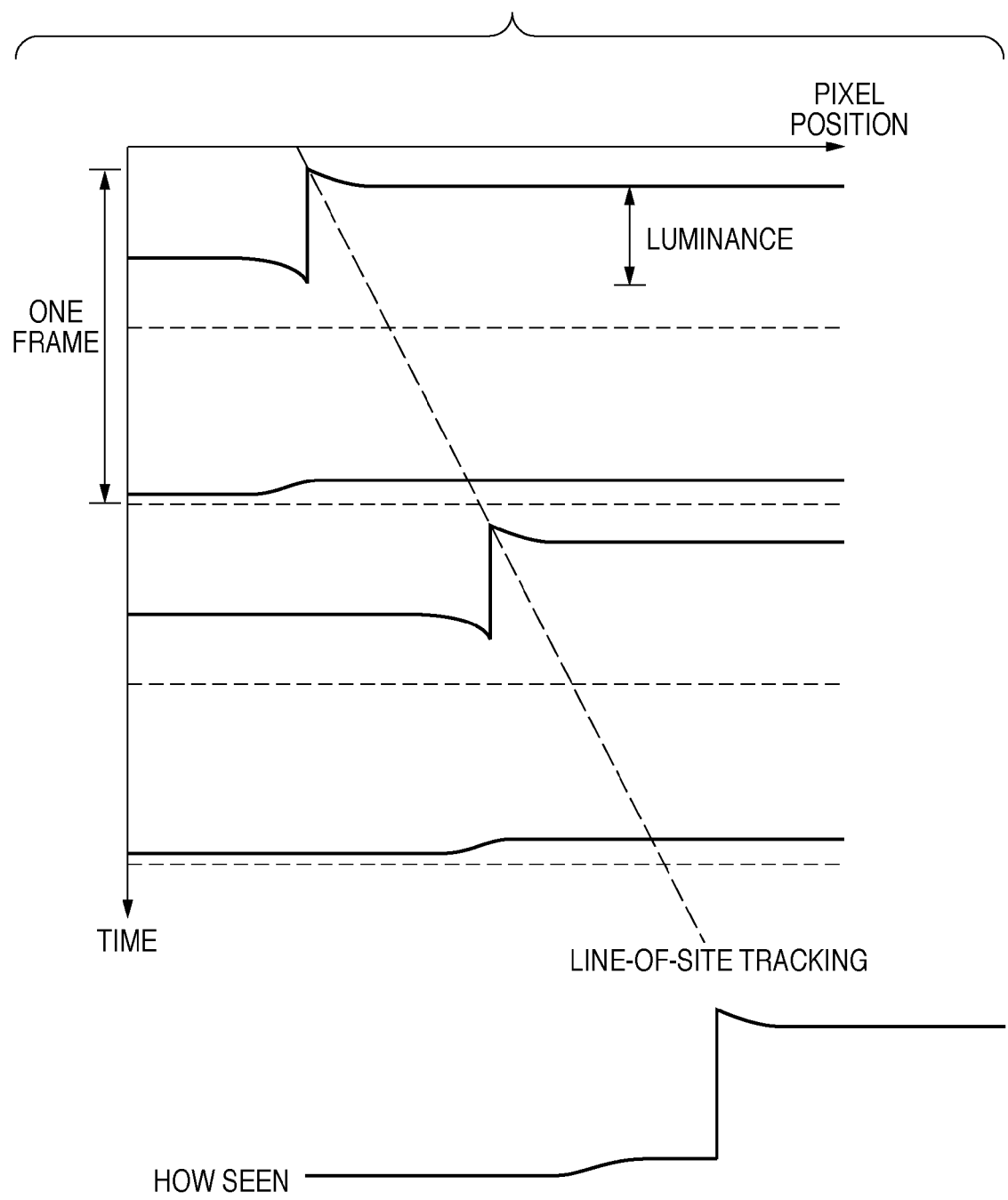

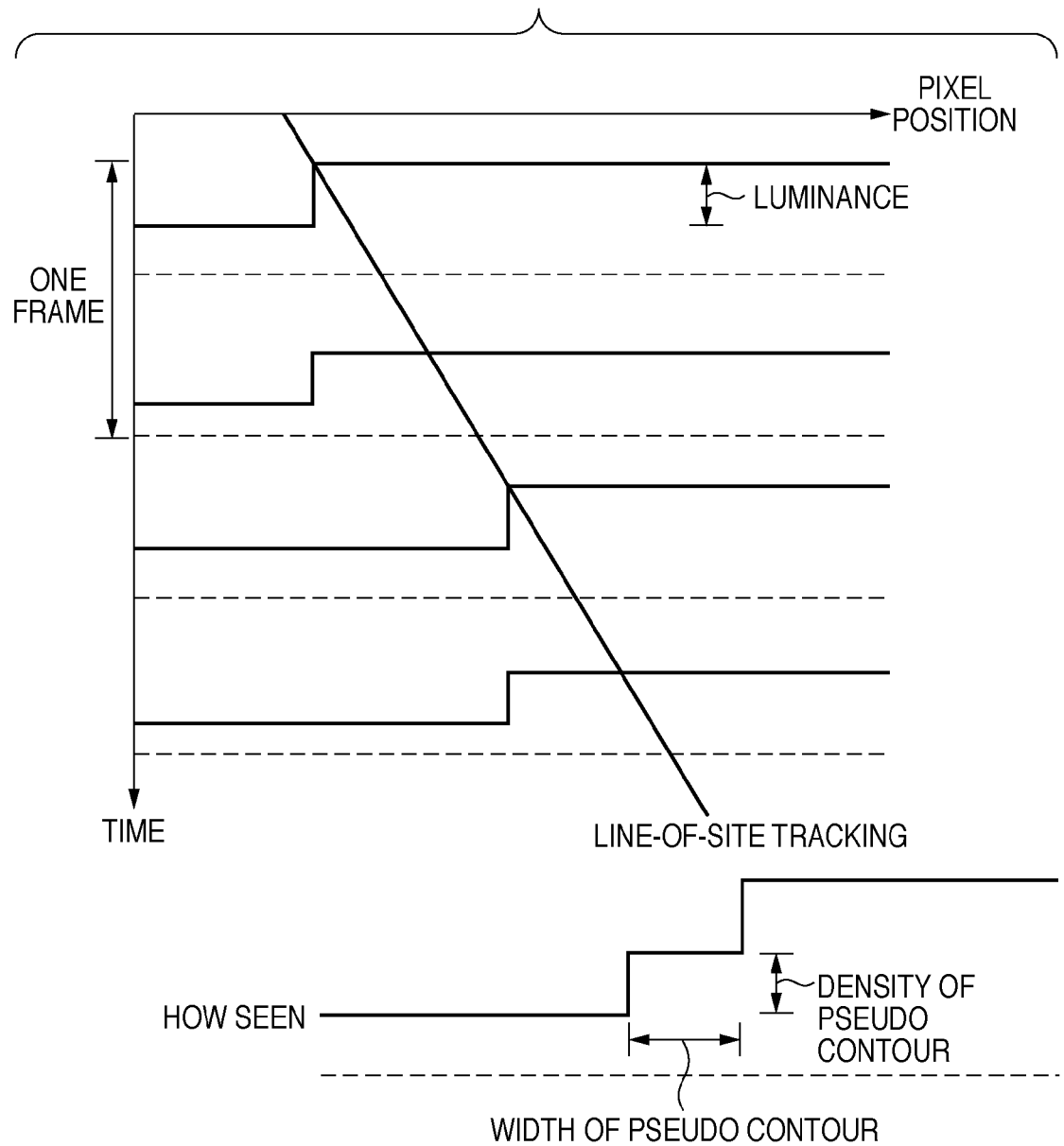

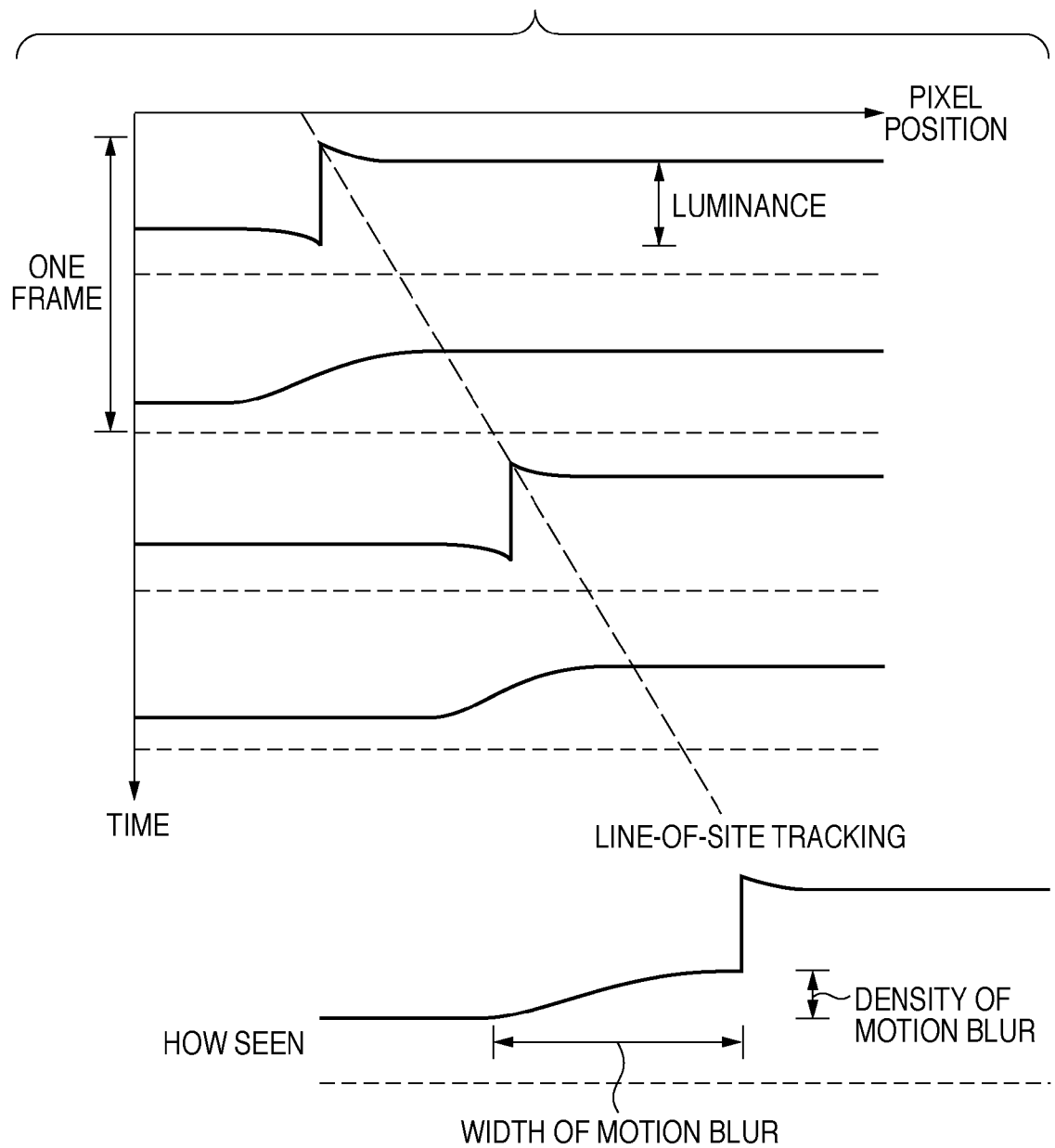

FRAME RATE CONVERSION APPARATUS, FRAME RATE CONVERSION METHOD, AND COMPUTER-READABLE STORAGE MEDIUM

BACKGROUND OF THE INVENTION

1. Field of the Invention

The present invention relates to a frame rate conversion apparatus, a frame rate conversion method, and a computer-readable storage medium that convert the frame rate of an input image (input frame).

2. Description of the Related Art

Display apparatuses are roughly classified according to their display characteristics into either an impulse type or a hold type. An apparatus such as a liquid crystal panel which holds a display almost uniformly during one frame period as shown in FIG. 12B will be referred to as a hold-type display apparatus. In contrast, an apparatus with a short period of light emission in one frame as shown in FIG. 12A will be referred to as an impulse-type display apparatus.

Impulse-type display apparatuses include a CRT (Cathode Ray Tube) and a field-emission type display. In impulse-type display, pixels repeatedly blink, and hence the display has a characteristic that causes flicker. That is, the screen appears to flicker. A higher luminosity and larger area correspond to easier flicker detection. With the recent tendency toward larger display screens, flicker on impulse-type display apparatuses is increasingly becoming a problem to be solved.

Methods of reducing flicker include a method of displaying an image at a higher frame rate by distributing an input frame into a plurality of sub-frames at an arbitrary ratio. If, for example, the frame rate is doubled by distributing an input frame into two sub-frames at a ratio of 6:4, since the frequency of flickering increases, flicker becomes difficult to detect.

However, when a user views this display, as shown in FIG. 13, a pseudo-contour, which depends on a visual characteristic, occurs because a temporally succeeding sub-frame can be seen to shift from line-of-sight tracking during a given frame period.

In order to reduce a pseudo-contour, there is disclosed a method of reducing a pseudo-contour by increasing/decreasing a high frequency component of the spatial frequency of a sub-frame (Japanese Patent Laid-Open No. 2002-351382).

According to the technique disclosed in Japanese Patent Laid-Open No. 2002-351382, however, since only a high frequency component is controlled, tailing-blur may occur when an image moves. FIG. 14 shows the relationship between an outline of a display output when the technique disclosed in Japanese Patent Laid-Open No. 2002-351382 is used and the manner of how the display output is seen. Referring to FIG. 14, the luminance of a low-frequency component is left in a temporally succeeding sub-frame in one frame period. In this case, the luminance of this low-frequency component causes tailing-blur.

SUMMARY OF THE INVENTION

The present invention provides a frame rate conversion apparatus, frame rate conversion method, and computer-readable storage medium which reduce a pseudo-contour and tailing-blur while maintaining the effect of reducing flicker.

According to a first aspect of the present invention, there is provided a frame rate conversion apparatus for performing frame rate conversion upon distributing an input frame into a plurality of sub-frames, the apparatus comprising: a motion detection unit configured to detect a degree of motion of an image in the input frame; a determination unit configured to determine an amount of distribution of the plurality of sub-frames in accordance with the degree of motion detected by the motion detection unit; and an output unit configured to distribute and output the plurality of sub-frames in accordance with the amount of distribution determined by the determination unit.

According to a second aspect of the present invention, there is provided a frame rate conversion method for performing frame rate conversion upon distributing an input frame into a plurality of sub-frames, the method comprising: detecting a degree of motion of an image in the input frame; determining an amount of distribution of the plurality of sub-frames in accordance with the detected degree of motion; and distributing and outputting the plurality of sub-frames in accordance with the determined amount of distribution.

According to a third aspect of the present invention, there is provided a computer-readable storage medium storing a computer program of causing a computer incorporated in a frame rate conversion apparatus which performs frame rate conversion upon distributing an input frame into a plurality of sub-frames to function as: a motion detection unit configured to detect a degree of motion of an image in the input frame, a determination unit configured to determine an amount of distribution of the plurality of sub-frames in accordance with the degree of motion detected by the motion detection unit, and an output unit configured to distribute and output the plurality of sub-frames in accordance with the amount of distribution determined by the determination unit.

Further features of the present invention will be apparent from the following description of exemplary embodiments with reference to the attached drawings.

BRIEF DESCRIPTION OF THE DRAWINGS

FIG. 9 is a view showing an example of an outline of a display output according to the modification and an example of an outline of the manner of how the display output is visually perceived;

FIG. 13 is a view showing an example of an outline of a display output when a pseudo-contour occurs and an example of an outline of the manner of how the display output is visually perceived; and FIG. 14 is a view showing an example of an outline of a display output when blur has occurred and an example of an outline of the manner of how the display output is visually perceived.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment

Figure 1:
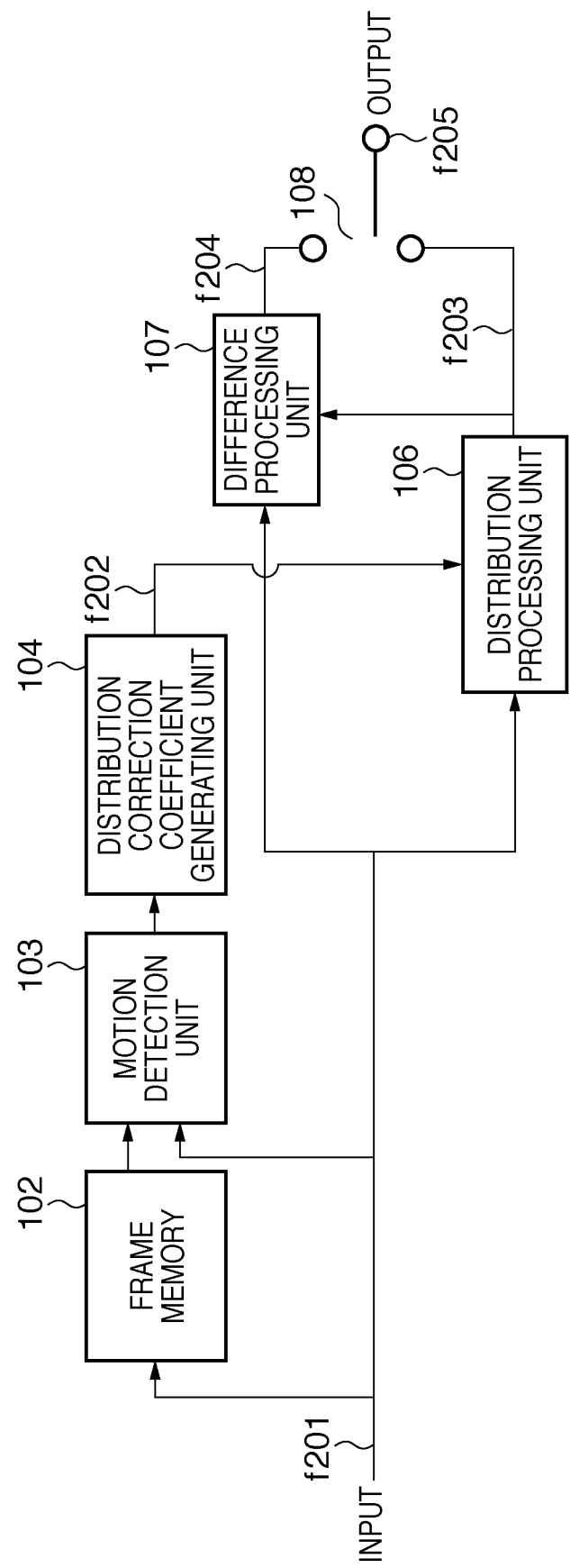
FIG. 1 is a block diagram showing an example of the schematic arrangement of a frame rate conversion apparatus according to an embodiment of the present invention.

FIG. 1 is a block diagram showing an example of the schematic arrangement of a frame rate conversion apparatus according to an embodiment of the present invention.

The frame rate conversion apparatus incorporates a computer. The computer includes a main control unit such as a CPU and storage units such as a ROM (Read Only Memory) and a RAM (Random Access Memory). The computer may also include, for example, an input/output unit such as a display or a touch panel, and a communication unit such as a network card. Note that these constituent elements are connected via a bus or the like and are controlled by making the main control unit execute the programs stored in the storage unit.

The frame rate conversion apparatus distributes an input image (to be referred to as an input frame hereinafter) into a plurality of sub-frames and outputs them at a plural (integer) multiple of the frame rate. In distributing an input frame, a motion is detected from an inter-frame difference, and an amount of distribution is determined with the detection result on the motion being reflected for each frame. Note that this embodiment will exemplify a case in which the frame rate of an input frame is doubled by frame rate conversion.

The frame rate conversion apparatus converts the frame rate of an input frame to reduce flickering on the screen, that is, the occurrence of flicker. The frequency of occurrence of flicker is associated with the contrast between distributed sub-frames. That is, in the case shown in FIG. 1, the occurrence of flicker is influenced by the contrast relationship between a sub-frame f203 and a sub-frame f204. The larger the luminance difference between them, the more easily flicker is detected, and vice versa. Note that the sub-frame f203 is output as a temporally succeeding sub-frame in one frame period, and the sub-frame f204 is output as a temporally preceding frame in one frame period.

The frame rate conversion apparatus controls the contrast between the sub-frame f203 and the sub-frame f204. This control is performed on the basis of the relationship between the motion detected between the respective frames and flicker. The sum of the luminances of the sub-frames f203 and f204 is equal to the luminance of an input frame f201. That is, the luminance remains the same before and after frame rate conversion.

In this case, the frame rate conversion apparatus includes, as its functional constituent elements, a frame memory 102, a motion detection unit 103, a distribution correction coefficient generating unit 104, a distribution processing unit 106, a difference processing unit 107, and a switch 108.

The frame memory 102 sequentially holds one or more input frames. The motion detection unit 103 compares a frame held in the frame memory 102 with the input frame f201, and calculates and outputs a degree M of motion of the image in the input frame 1201.

The distribution correction coefficient generating unit 104 calculates a distribution correction coefficient $R_L$ in accordance with the degree M of motion, and outputs it to the distribution processing unit 106. The distribution processing unit 106 converts the value of the input frame f201 in accordance with a basic distribution function and the distribution correction coefficient $R_L$, and outputs the result as the sub-frame f203.

The difference processing unit 107 calculates and outputs the sub-frame f204 on the basis of the sub-frame f203 and the input frame f201. The switch 108 alternately switches and outputs the sub-frame f203 and the sub-frame f204.

Figure 2:
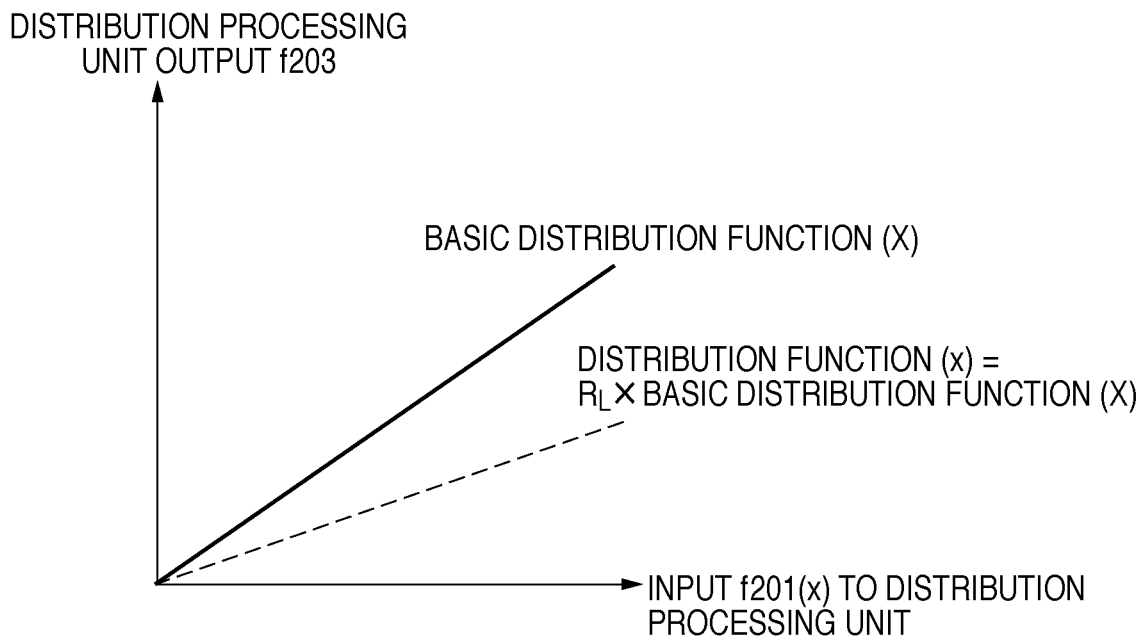
FIG. 2 is a graph showing an example of an input/output relationship in a distribution processing unit 106 shown in FIG. 1.

FIG. 2 is a graph showing an example of an input/output relationship in the distribution processing unit 106. The distribution processing unit 106 converts each signal of the input frame f201 in accordance with a distribution function, and outputs the result as a signal of the sub-frame f203. The distribution function is calculated by the product of the distribution correction coefficient $R_L$ input from the distribution correction coefficient generating unit 104 and the basic distribution function. The basic distribution function indicates the value of the sub-frame f203 when the input is a still image.

$$\text{distribution function }(x) = R_L \times \text{basic distribution function }(x) \qquad (1)$$

The value of the sub-frame f203 is dynamically increased/decreased by the distribution correction coefficient $R_L$ input for each frame. If, for example, the degree M of motion of an input frame is high, the distribution correction coefficient $R_L$ becomes a small value, and the value of the sub-frame f203 to be output becomes small. That is, if the motion of an input frame is large, since the signal amount of the sub-frame output as a temporally succeeding sub-frame during one frame period becomes small, a pseudo-contour and trailing-blur are improved.

Figure 3:
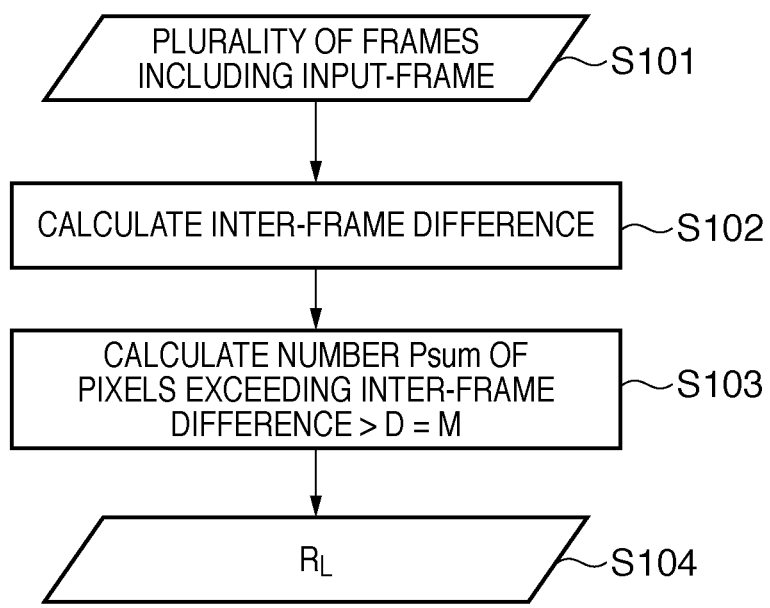
FIG. 3 is a flowchart showing an example of processing in a motion detection unit 103 shown in FIG. 1.

FIG. 3 is a flowchart showing an example of processing in the motion detection unit 103. The motion detection unit 103 calculates an inter-frame difference from an input frame and a frame input before (for example, immediately before) the input frame (steps S101 and S102). The motion detection unit 103 then outputs, as the degree M of motion of the input frame, the total number of pixels having the differences (absolute value) exceeding a threshold D (steps S103 and S104).

$$M = \text{count}(\text{abs}(fn-1(x)-fn(x)) \geq D) \qquad (2)$$

Figure 4:
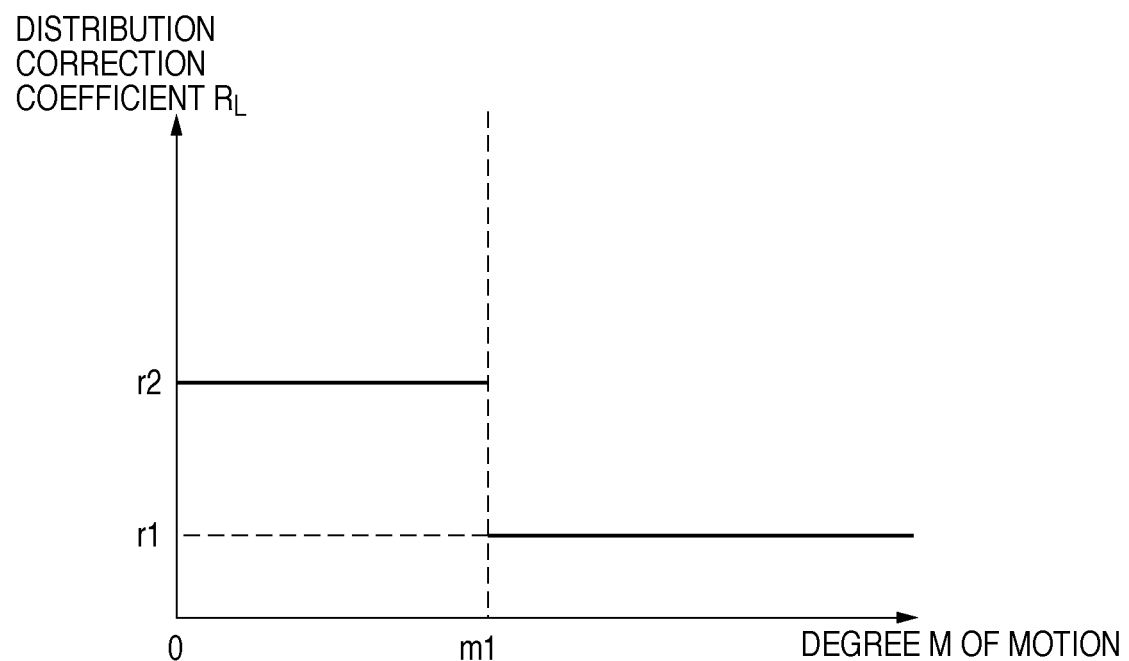
FIG. 4 is a graph showing an example of an input/output relationship in a distribution correction coefficient generating unit 104 shown in FIG. 1.

FIG. 4 is a graph showing an example of an input/output relationship in the distribution correction coefficient generating unit 104. In this case, the input value is the degree M of motion, and the output is the distribution correction coefficient $R_L$ output in accordance with the degree M of motion.

If the input degree M of motion is less than or equal to a (predetermined) threshold m1, the distribution correction coefficient generating unit 104 outputs a value r2. If the input degree M of motion is higher than the threshold m1, the distribution correction coefficient generating unit 104 outputs a value r1. For example, the values r1 and r2 are greater than or equal to 0 and less than or equal to 1, and the value r2 is larger than the value r1.

If the area of a motion region is small and the degree M of motion is low, flicker tends to be detected. Therefore, the larger the output value of the sub-frame f203, the better. For this reason, the distribution correction coefficient $R_L$ is set so as to make the signal amount of the sub-frame f203 become almost equal to that required for a still image. In this case, the distribution correction coefficient $R_L$ is the value r2 close to 1.

If the area of a motion region is larger and the degree M of motion is high, flicker is not easily detected. For this reason, no problem arises even if the output value of the sub-frame f203 is small. In addition, as the output value of the sub-frame f203 is decreased, a pseudo-contour and trailing-blur are reduced. Therefore, the distribution correction coefficient $R_L$ is the value r1 close to 0. As described above, the distribution correction coefficient generating unit 104 in this embodiment generates the distribution correction coefficient $R_L$ by threshold processing. This simplifies arithmetic operation.

The difference processing unit 107 calculates the difference between the input frame f201 and the sub-frame f203, and outputs the result as the sub-frame f204. Therefore, the sum of sub-frames to be output is equal to the input frame. In the case of an impulse-type display apparatus, since the sums of signals displayed in an arbitrary time are equal, the apparent brightnesses look almost equal. It is therefore possible to keep the brightness of a frame before and after frame rate conversion almost equal.

Figure 5A:
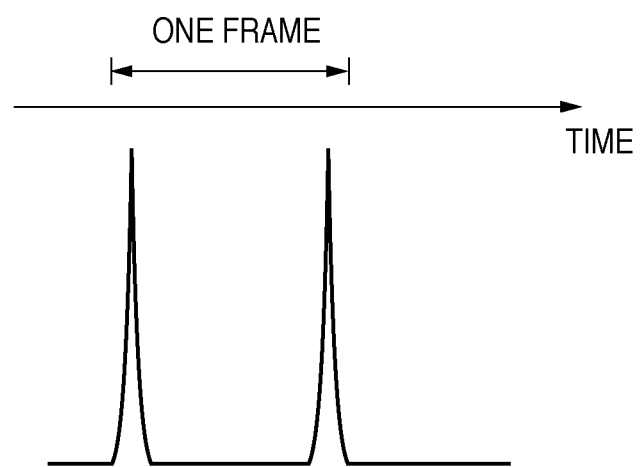
FIGS. 5A to 5C are views each showing an example of an emission luminance.
Figure 5B:
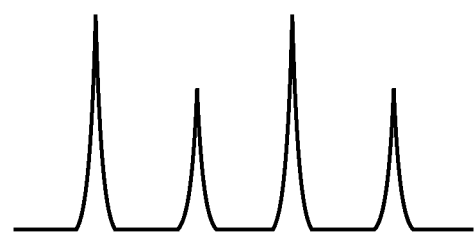
Figure 5C:
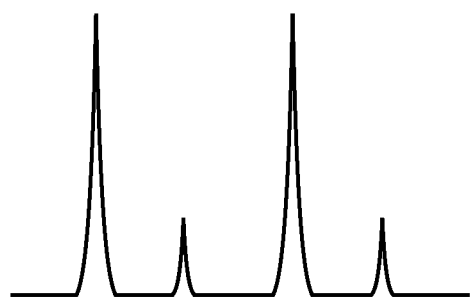

FIG. 5A shows the input frame f201. FIGS. 5B and 5C show outputs when the distribution correction coefficient $R_L$ changes.

If the degree M of motion of an input frame is low, the distribution correction coefficient $R_L$ is large, as described above. For this reason, the amount of distribution of the sub-frame f203 output as a temporally succeeding sub-frame in one frame period becomes large, and hence the signal amount becomes large. The waveform shown in FIG. 5B indicates the luminance of each sub-frame in this case. If the degree M of motion of an input frame is low, flicker tends to be detected. However, since the signal amount of the sub-frame f203 is ensured to be a level at which flicker can be reduced, the occurrence of flicker can be prevented.

In contrast, if the degree M of motion of an input frame is high, the distribution correction coefficient $R_L$ is small, as described above. As a consequence, the amount of distribution of the sub-frame f203 output as a temporally succeeding sub-frame in one frame period becomes small, and hence the signal amount becomes small. The waveform shown in FIG. 5C indicates the luminance of each sub-frame in this case. If the degree M of motion of an input frame is high, flicker is rarely detected. Even if, therefore, the signal amount of the sub-frame f203 is small, the possibility of the occurrence of flicker is low.

Figure 6:
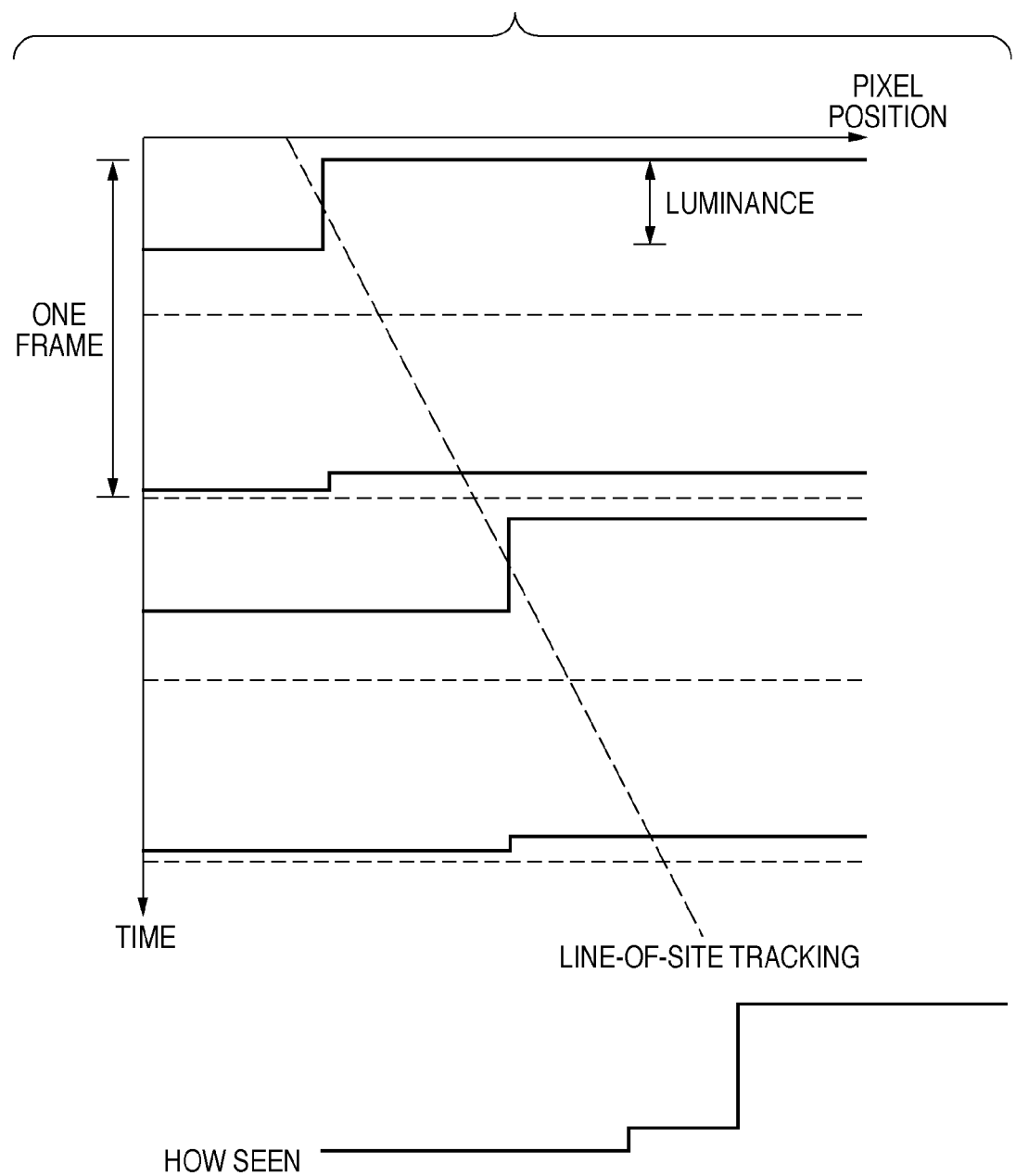
FIG. 6 is a view showing an example of an outline of a display output in the case shown in FIG. 5C and an example of an outline of the manner of how the display output is visually perceived.

In this case, for example, the relationship shown in FIG. 6 indicates an outline of a display output in a case in which the luminance of each sub-frame is represented by the waveform shown in FIG. 5C and the manner of how the display output is visually perceived. As shown in FIG. 6, when the degree M of motion of an input frame is high, since the signal amount of a temporally succeeding sub-frame is limited to a low level, it is obvious that a pseudo-contour is reduced.

Figure 7:
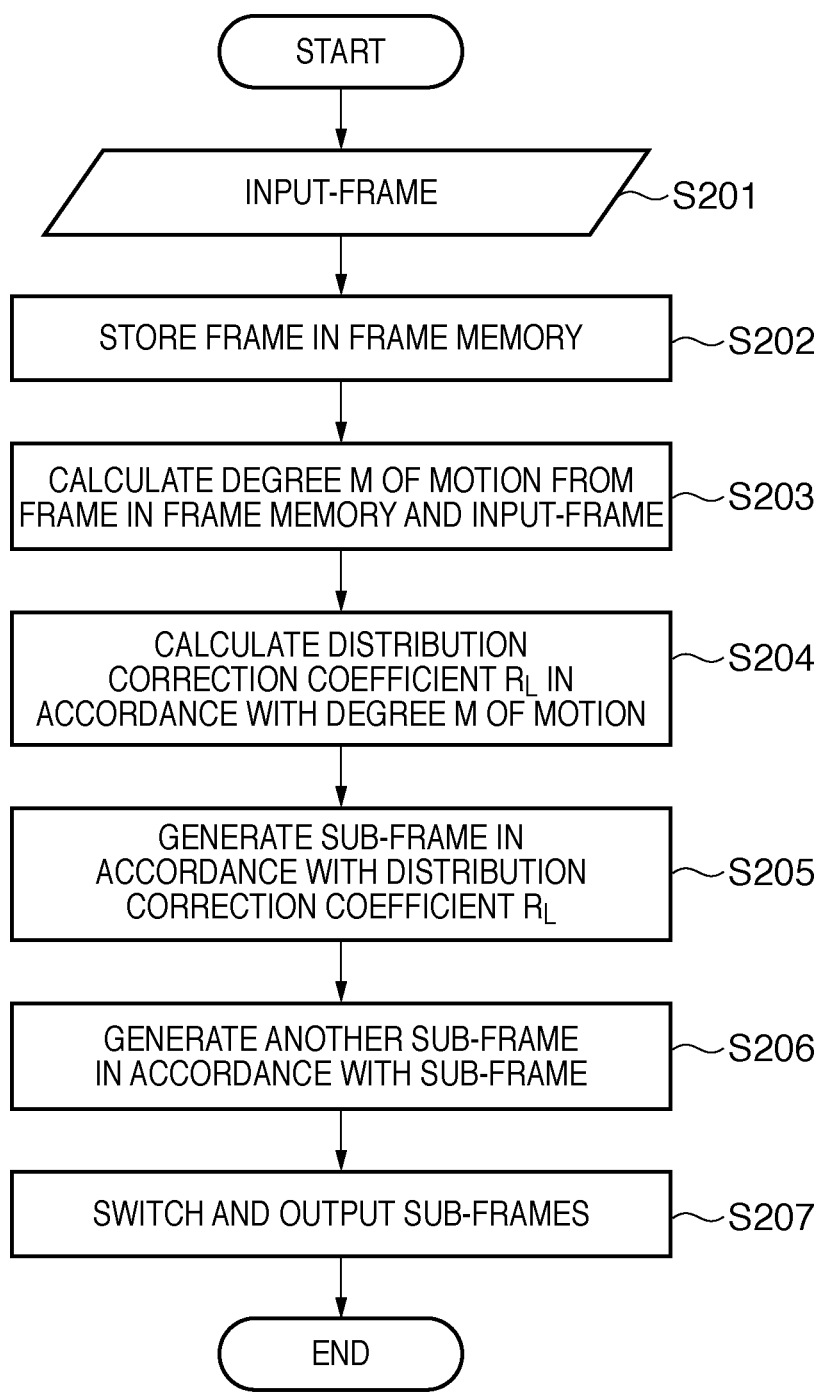
FIG. 7 is a flowchart showing an example of a processing sequence in the frame rate conversion apparatus shown in FIG. 1.

A processing sequence in the frame rate conversion apparatus shown in FIG. 1 will be described next with reference to FIG. 7.

Upon receiving the input frame f201 (step S201), the frame rate conversion apparatus stores the frame in the frame memory 102 (step S202). Upon completion of storage of this frame, the frame rate conversion apparatus causes the motion detection unit 103 to calculate the degree M of motion by comparing the input frame f201 with the frame which has already been stored in the frame memory 102 (step S203).

Subsequently, the frame rate conversion apparatus causes the distribution correction coefficient generating unit 104 to calculate the distribution correction coefficient $R_L$ corresponding to the calculated degree M of motion (step S204). Upon completing calculation of the distribution correction coefficient $R_L$, the frame rate conversion apparatus causes the distribution processing unit 106 to generate the sub-frame f203 by converting the value of the input frame f201 in accordance with the basic distribution function and the distribution correction coefficient $R_L$ (step S205).

Upon completing generation of the sub-frame f203, the frame rate conversion apparatus causes the difference processing unit 107 to generate the sub-frame f204 from the difference between the input frame f201 and the sub-frame f203 (step S206). The frame rate conversion apparatus then causes the switch 108 to alternately switch and output the sub-frame f203 and the sub-frame f204 (step S207). Subsequently, every time an input frame is input, the above processing is repeatedly executed.

As described above, according to this embodiment, the degree of motion is detected from the input frame 1201, and the amounts of distribution of sub-frames f203 and f204 are determined in accordance with the detection result. This makes it possible to reduce a pseudo-contour and trailing-blur while maintaining the effect of reducing flicker.

The above is a typical embodiment of the present invention. However, the present invention is not limited to the above embodiment shown in the accompanying drawings and can be modified and executed as needed within the scope of the present invention.

Figure 8:
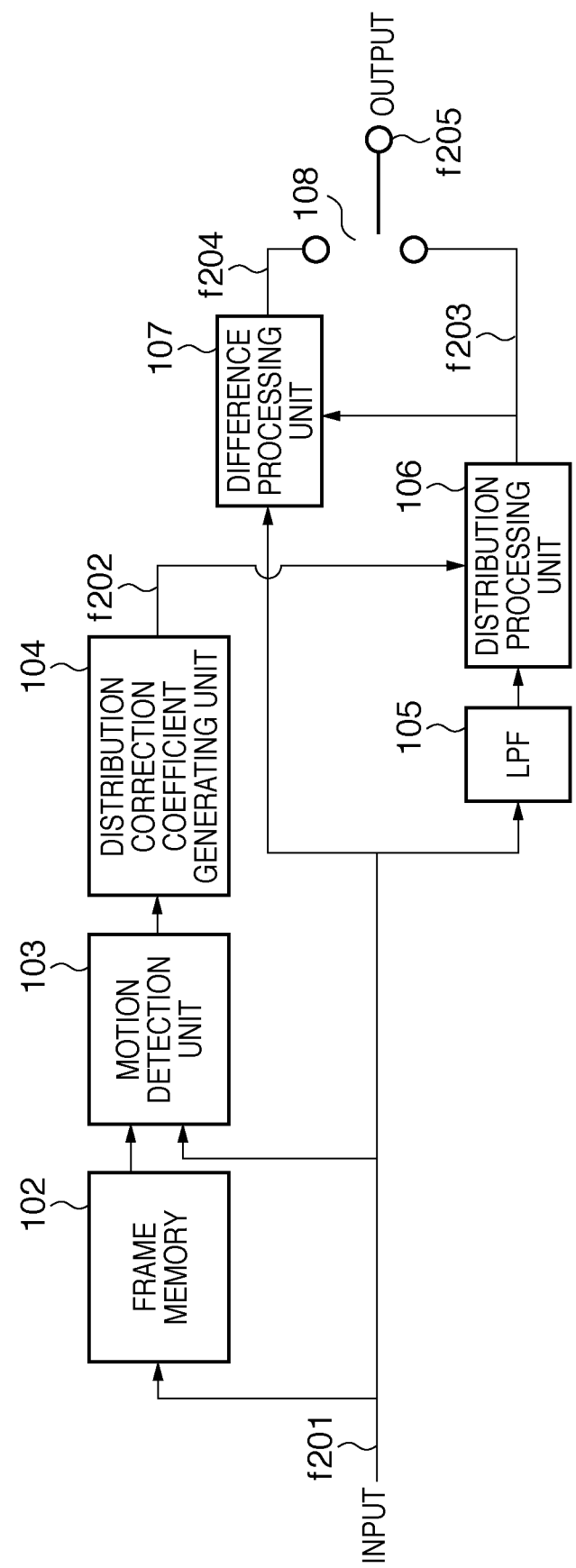
FIG. 8 is a block diagram showing an example of the schematic arrangement of a frame rate conversion apparatus according to a modification.

For example, as an application of the above embodiment, it suffices to add an LPF (Low-Pass Filter) 105 to the arrangement of the frame rate conversion apparatus shown in FIG. 1. The LPF 105 is a filter which passes only low frequencies. That is, this filter has a function of removing signals in a high-frequency band which tend to become noise. For example, as shown in FIG. 8, the LPF 105 is arranged upstream of the distribution processing unit 106 and removes signals in a high-frequency band input to the distribution processing unit 106. In this arrangement, the relationship shown in FIG. 9 indicates an outline of a display output and the manner of how the display output is visually perceived. The following will exemplify the relationship between an outline of a display output when the degree M of motion of the input frame is high and the manner of how the display output is seen. In this case, the signal amount of a temporally succeeding sub-frame in one frame period is suppressed to be small. In addition, high frequency components are removed. That is, the sub-frame mainly includes low-frequency components. This makes it possible to further reduce trailing-blur as compared with the above arrangement.

Figure 10:
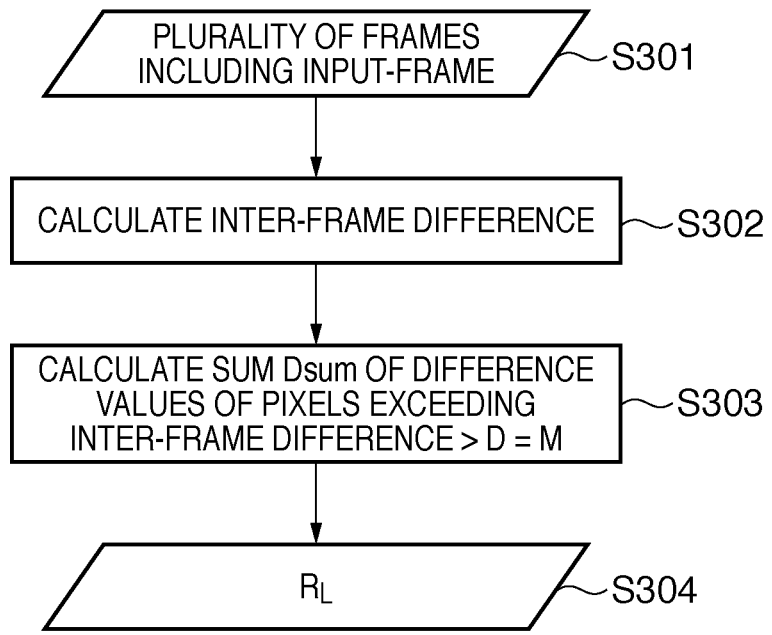
FIG. 10 is a flowchart showing an example of processing in the motion detection unit 103 according to the modification.

The above embodiment has exemplified the case in which the degree M of motion of an input frame is detected by regarding, as the degree M of motion, the total number of pixels having the inter-frame differences exceeding the threshold D. However, the degree M of motion can be calculated by other methods. For example, the sum of difference values of pixels having the inter-frame differences (absolute values) exceeding the threshold D can be regarded as the degree M of motion (see equation (3) below). A processing sequence in the motion detection unit 103 in this case will be described with reference to FIG. 10. The motion detection unit 103 calculates an inter-frame difference from an input frame and a frame input before (for example, immediately before) the input frame (steps S301 and S302). The motion detection unit 103 then outputs, as the degree M of motion of the input frame, the sum of the difference values (absolute values) of pixels having the inter-frame differences (absolute value) exceeding the threshold D (steps S303 and S304). This motion detection method uses the tendency that the inter-frame difference increases as the amount of motion of even the same object increases or the contrast of the object becomes higher even with the same amount of motion.

$$M = \sum_x (\text{abs}(fn-1(x) - fn(x)) \mid \text{abs}(fn-1(x) - fn(x) \geq D) \quad (3)$$

Figure 11:
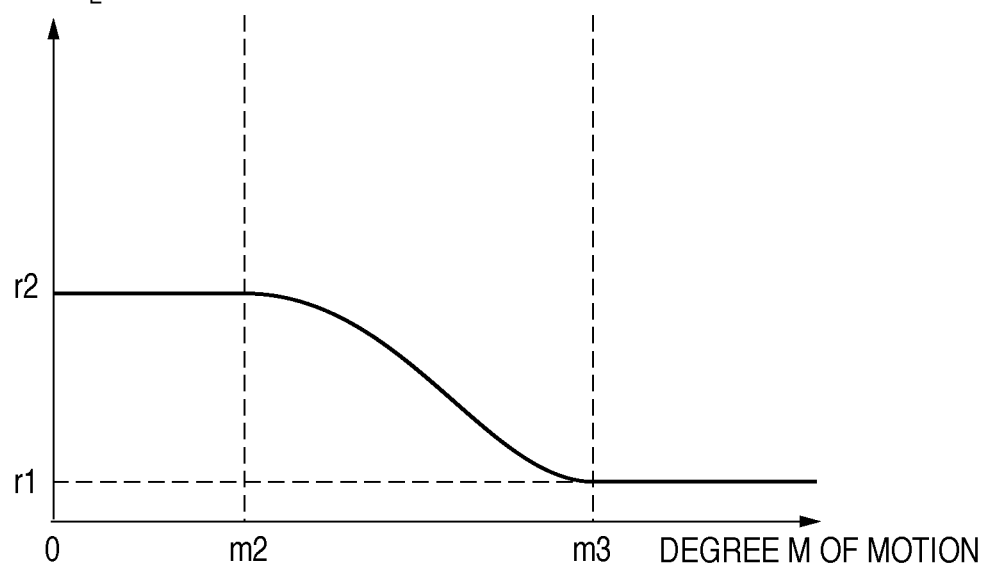
FIG. 11 is a graph showing an example of an input/output relationship in the distribution correction coefficient generating unit 104 according to the modification.
Figure 12A:
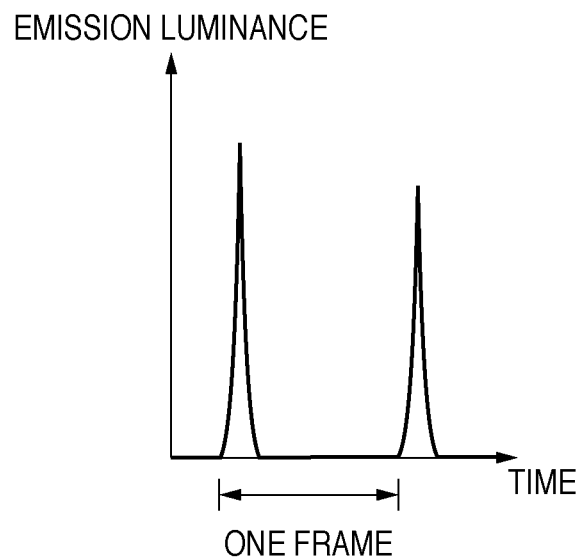
FIGS. 12A and 12B are graphs each showing an example of an emission luminance in a display apparatus.
Figure 12B:
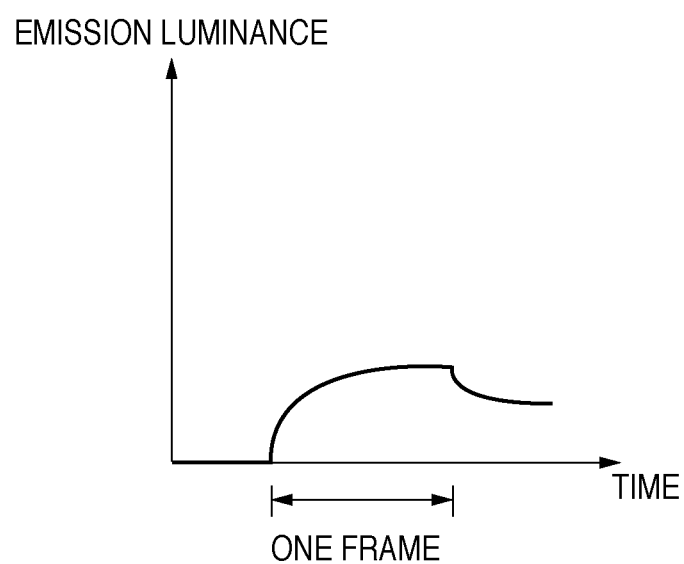

The above-described embodiment has exemplified the case in which the distribution correction coefficient $R_L$ output from the distribution correction coefficient generating unit 104 is a binary value (r1, r2). However, the present invention is not limited to this. FIG. 11 is a graph showing an example of an input/output relationship in the distribution correction coefficient generating unit 104. Note that the input value is the degree M of motion, and the output value is the distribution correction coefficient $R_L$ output in accordance with the degree M of motion.

The distribution correction coefficient $R_L$ is calculated by using, for example, a plurality of functions or a lookup table. If the input degree M of motion is less than or equal to a threshold m2 as the first value, the distribution correction coefficient generating unit 104 outputs the value r2 as the distribution correction coefficient $R_L$. If the degree M of motion is larger than a threshold m3 as the second value, the distribution correction coefficient generating unit 104 outputs the value r1. If the degree M of motion is between m2 and m3, the distribution correction coefficient $R_L$ outputs a value between r2 and r1. If the degree M of motion is between m2 and m3, the value of the distribution correction coefficient $R_L$ smoothly decreases as the degree M of motion increases. In this case, the signal amount of the sub-frame f203 smoothly decreases with a change in the degree M of motion.

The present invention can adopt embodiments in the forms of, for example, a system, an apparatus, a method, a program, and a storage medium. The present invention may be applied to either a system constituted by a plurality of devices, or an apparatus consisting of a single device.

The present invention includes a case wherein the functions of the aforementioned embodiments are achieved when a software program is directly or remotely supplied to a system or apparatus, and a computer incorporated in that system or apparatus reads out and executes the supplied program codes. The program to be supplied in this case is a computer program corresponding to the illustrated flowcharts in the embodiments.

Therefore, the program codes themselves installed in a computer to implement the functional processing of the present invention using the computer also implement the present invention. That is, the present invention includes the computer program itself for implementing the functional processing of the present invention. In this case, the form of program is not particularly limited, and an object code, a program to be executed by an interpreter, script data to be supplied to an OS (Operating System), and the like may be used as long as they have the functions of the program.

As a computer-readable storage medium for supplying the computer program, the following media can be used. As another program supply method, the user establishes connection to a website on the Internet using a browser on a client computer, and downloads the computer program of the present invention from the website onto a recording medium such as a hard disk.

The functions of the aforementioned embodiments can be implemented when the computer executes the read out program. In addition, the functions of the aforementioned embodiments may be implemented in collaboration with an OS or the like running on the computer based on an instruction of that program. In this case, the OS or the like executes some or all of actual processes, which implement the functions of the aforementioned embodiments.

As described above, according to the present invention, the degree of motion of an image in an input frame is detected, and the amount of distribution of sub-frames is determined in accordance with the detection result. This makes it possible to reduce a pseudo-contour and trailing-blur while maintaining the effect of reducing flicker.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-119987 filed on May 1, 2008, which is hereby incorporated by reference herein in its entirety.

What is claimed is:

1. A frame rate conversion apparatus comprising:
a detection unit configured to detect a degree of motion by comparing pixels in an image frame with pixels in another image frame;
a generation unit configured to generate first and second sub-frames corresponding to the image frame such that the first sub-frame having a higher luminance is generated in a case where a first degree of motion smaller than a second degree of motion is detected in comparison with a case where the second degree of motion is detected, and the second sub-frame having a higher luminance than the first sub-frame is generated based on the difference between the first sub-frame and the image frame; and
an output unit configured to output the first and second sub-frames generated by the generation unit.

2. The apparatus according to claim 1, wherein the detection unit acquires the difference between the pixel values in the image frame and the pixel values in the another image frame by the comparing and detects the degree of motion of the image frame, based on a total number of pixels having the difference exceeding a threshold.

3. The apparatus according to claim 1, wherein the detection unit acquires the difference between the pixel values in the image frame and pixel values in the another image frame by the comparing and detects the degree of motion of the image frame, based on a sum of difference values having the differences exceeding a threshold.

4. The apparatus according to claim 1, wherein when the degree of motion detected by the detection unit is smaller than the first degree of motion, the generation unit generates the first sub-frame having higher luminance than when the degree of motion detected by the detection unit is the first degree of motion.

5. The apparatus according to claim 1, wherein the output unit outputs the first sub-frame after outputting the second sub-frame.

6. The apparatus according to claim 1, further comprising:
a determination unit configured to determine a coefficient in accordance with the degree of motion detected by the detection unit, wherein the determination unit determines a higher coefficient in a case where the detection unit detects the first degree of motion smaller than the second degree of motion in comparison with a case where the detection unit detects the second degree of motion, and wherein the generation unit generates the first sub-frame based on the coefficient determined by the determination unit.

7. A frame rate conversion method comprising the steps of:
detecting a degree of motion by comparing pixels in an image frame with pixels in another image frame;
generating first and second sub-frames corresponding to the image frame such that the first sub-frame having higher luminance is generated in a case where a first degree of motion smaller than a second degree of motion is detected in comparison with a case where the second degree of motion is detected, and the second sub-frame having a higher luminance than the first sub-frame is generated based on the difference between the first sub-frame and the image frame; and
outputting the first and second sub-frames generated by the generating step.

8. The method according to claim 7, further comprising:
determining a coefficient in accordance with the degree of motion detected by the detecting step, wherein the determining step determines a higher coefficient in a case where the detecting step detects the first degree of motion smaller than the second degree of motion in comparison with a case where the detecting step detects the second degree of motion, and wherein the generating step generates the first sub-frame based on the coefficient determined by the determining step.

9. The method according to claim 7, wherein the detecting step acquires difference between the pixel values in the image frame and the pixel values in the another image frame by the comparing, and detects the degree of motion of the image frame based on a total number of pixels having the difference exceeding a threshold.

10. The method according to claim 7, wherein the detecting step acquires the difference between the pixel values in the image frame and the pixel values in the another image frame by the comparing, and detects the degree of motion of the image frame based on a sum of difference values of pixels having the differences exceeding a threshold.

11. A non-transitory computer-readable storage medium storing a computer program of causing a computer incorporated in a frame rate conversion apparatus to function as:
a motion detection unit configured to detect a degree of motion by comparing pixels in the image frame with pixels in another image frame,
a generation unit configured to generate first and second sub-frames corresponding to the image frame such that the first sub-frame having higher luminance is generated in a case where a first degree of motion smaller than a second degree of motion is detected in comparison with in a case where the second degree of motion is detected, and the second sub-frame having a higher luminance than the first sub-frame is generated based on the difference between the first sub-frame and the image frame; and
an output unit configured to output the first and second sub-frames generated by the generation unit.

* * * * *